United States Patent
Jilani et al.

(10) Patent No.: US 9,860,164 B2
(45) Date of Patent: Jan. 2, 2018

(54) FLOW BASED VIRTUAL NETWORK FUNCTION ORCHESTRATION

(71) Applicants: Jaffar Hameed Abdul Kather Jilani, San Jose, CA (US); Keith M. Bly, Newman Lake, WA (US); Kyle Gosselin-Harris, Spokane Valley, WA (US)

(72) Inventors: Jaffar Hameed Abdul Kather Jilani, San Jose, CA (US); Keith M. Bly, Newman Lake, WA (US); Kyle Gosselin-Harris, Spokane Valley, WA (US)

(73) Assignee: Ciena Corporation, Hanover, MD (US)

( * ) Notice: Subject to any disclaimer, the term of this patent is extended or adjusted under 35 U.S.C. 154(b) by 132 days.

(21) Appl. No.: 15/003,352

(22) Filed: Jan. 21, 2016

(65) Prior Publication Data
US 2017/0214608 A1  Jul. 27, 2017

(51) Int. Cl.
| | | |
|---|---|---|
| H04L 12/28 | (2006.01) | |
| H04L 12/721 | (2013.01) | |
| H04L 12/713 | (2013.01) | |
| H04L 12/801 | (2013.01) | |

(52) U.S. Cl.
CPC .......... *H04L 45/566* (2013.01); *H04L 45/586* (2013.01); *H04L 47/35* (2013.01); *H04L 45/38* (2013.01)

(58) Field of Classification Search
CPC ..... H04L 2012/5617; H04L 2012/5621; H04L 2012/5626; H04L 2012/2638
USPC ........ 370/254, 351, 400, 464, 465; 709/223, 709/226, 227, 249
See application file for complete search history.

(56) References Cited

U.S. PATENT DOCUMENTS

| | | | | |
|---|---|---|---|---|
| 9,444,725 | B2 * | 9/2016 | Sella | H04L 45/306 |
| 2016/0080172 | A1 * | 3/2016 | Uberoy | H04L 41/0843 370/254 |
| 2016/0149774 | A1 * | 5/2016 | Chastain | H04L 43/028 370/241 |
| 2016/0246652 | A1 * | 8/2016 | Herdrich | G06F 9/5077 |
| 2016/0277509 | A1 * | 9/2016 | Qiang | H04L 67/16 |
| 2016/0335111 | A1 * | 11/2016 | Bruun | G06F 9/45558 |
| 2016/0373359 | A1 * | 12/2016 | Bruun | H04L 47/20 |
| 2017/0034050 | A1 * | 2/2017 | Sunavala | H04L 45/586 |
| 2017/0142206 | A1 * | 5/2017 | Kodaypak | H04L 12/1407 |

* cited by examiner

*Primary Examiner* — Dmitry H Levitan
(74) *Attorney, Agent, or Firm* — Osha Liang LLP

(57) ABSTRACT

A method for computing device management includes receiving a first incoming packet by a first computing device, analyzing the first incoming packet to identify a virtual network function (VNF) needed to process the first incoming packet, transmitting, to a software defined network controller and in response to the first incoming packet, an orchestration request requesting to orchestrate the VNF on the first computing device, and orchestrating the VNF on the first computing device. The method further includes processing a second incoming packet using the VNF on the first computing device.

20 Claims, 15 Drawing Sheets

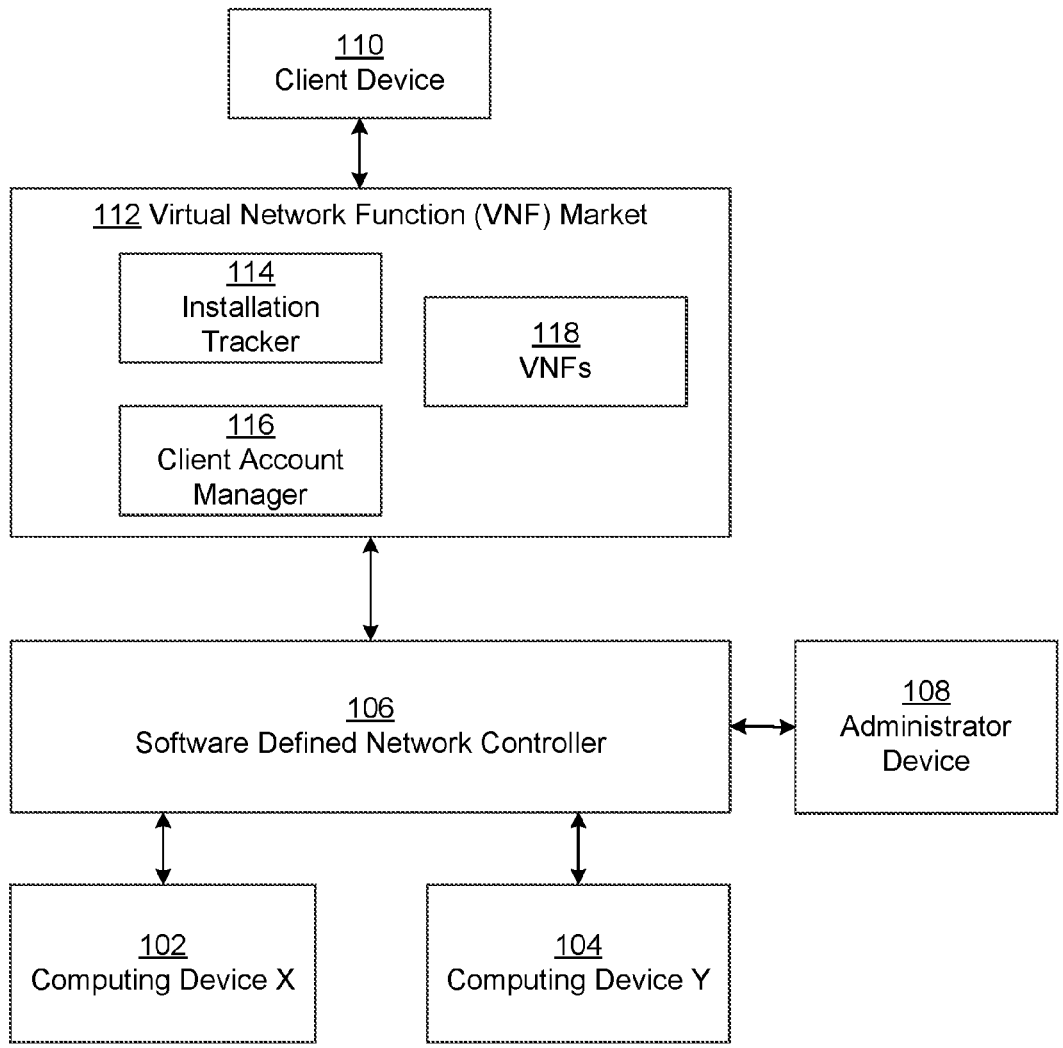
FIG. 1.1

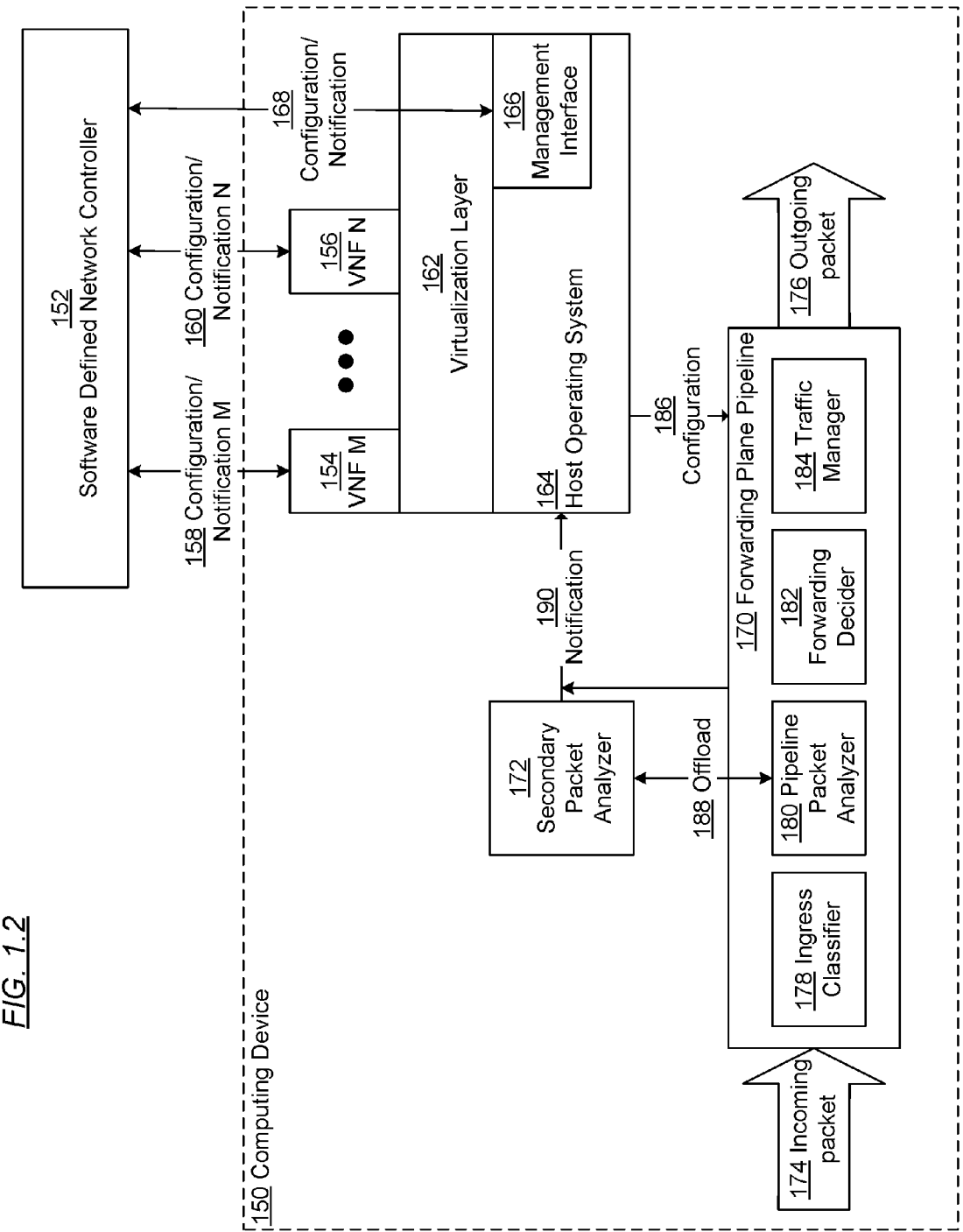
FIG. 1.2

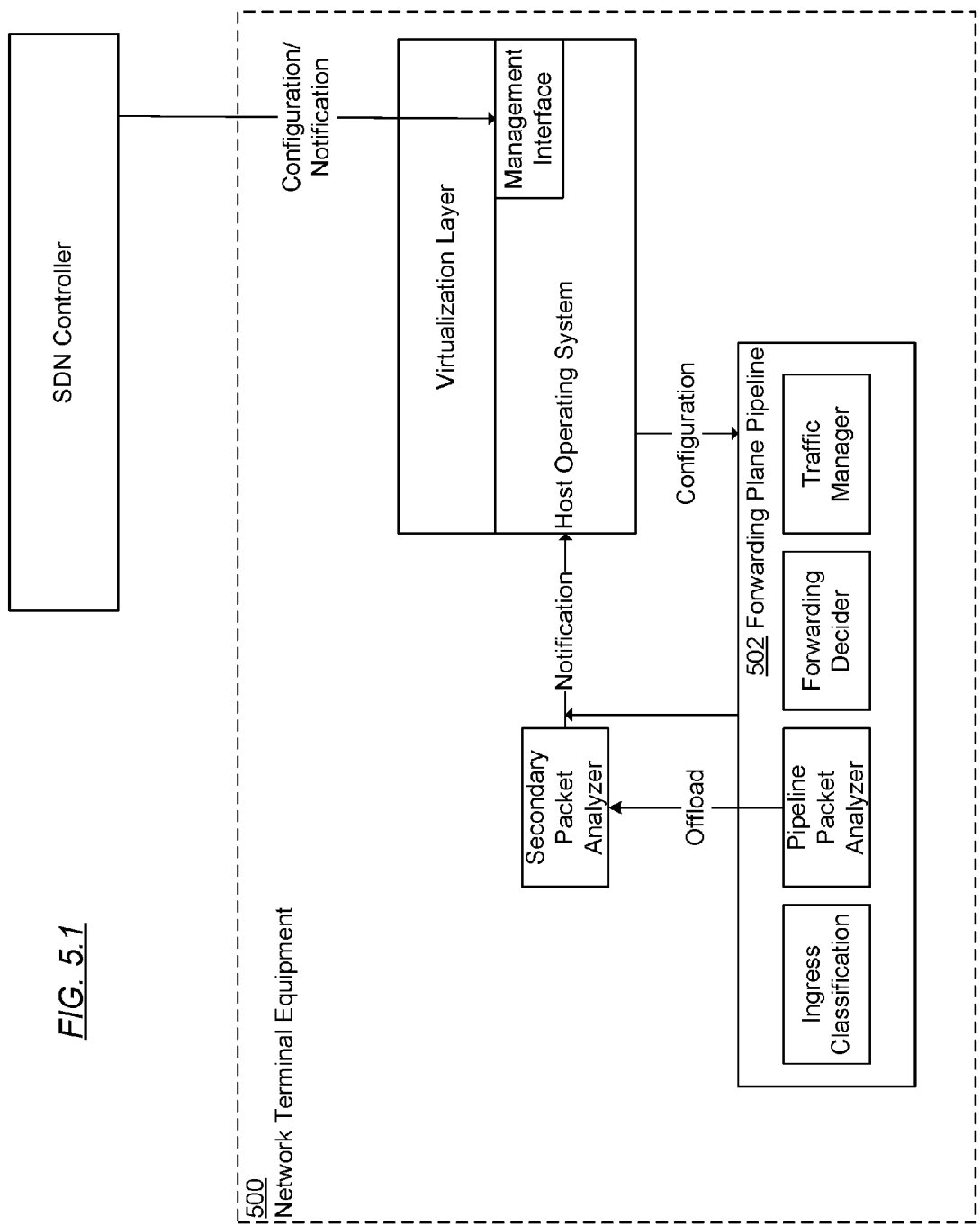
FIG. 5.1

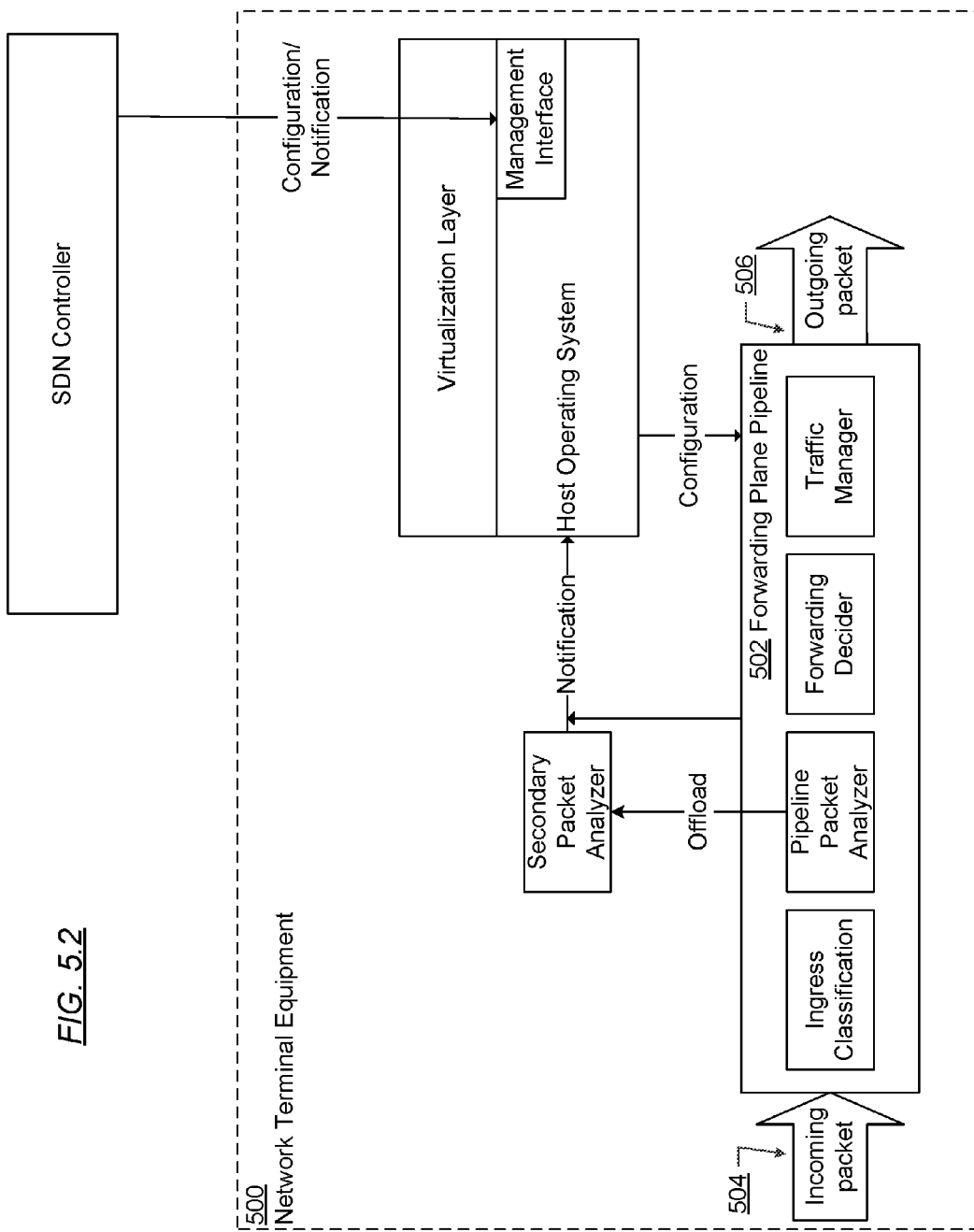
FIG. 5.2

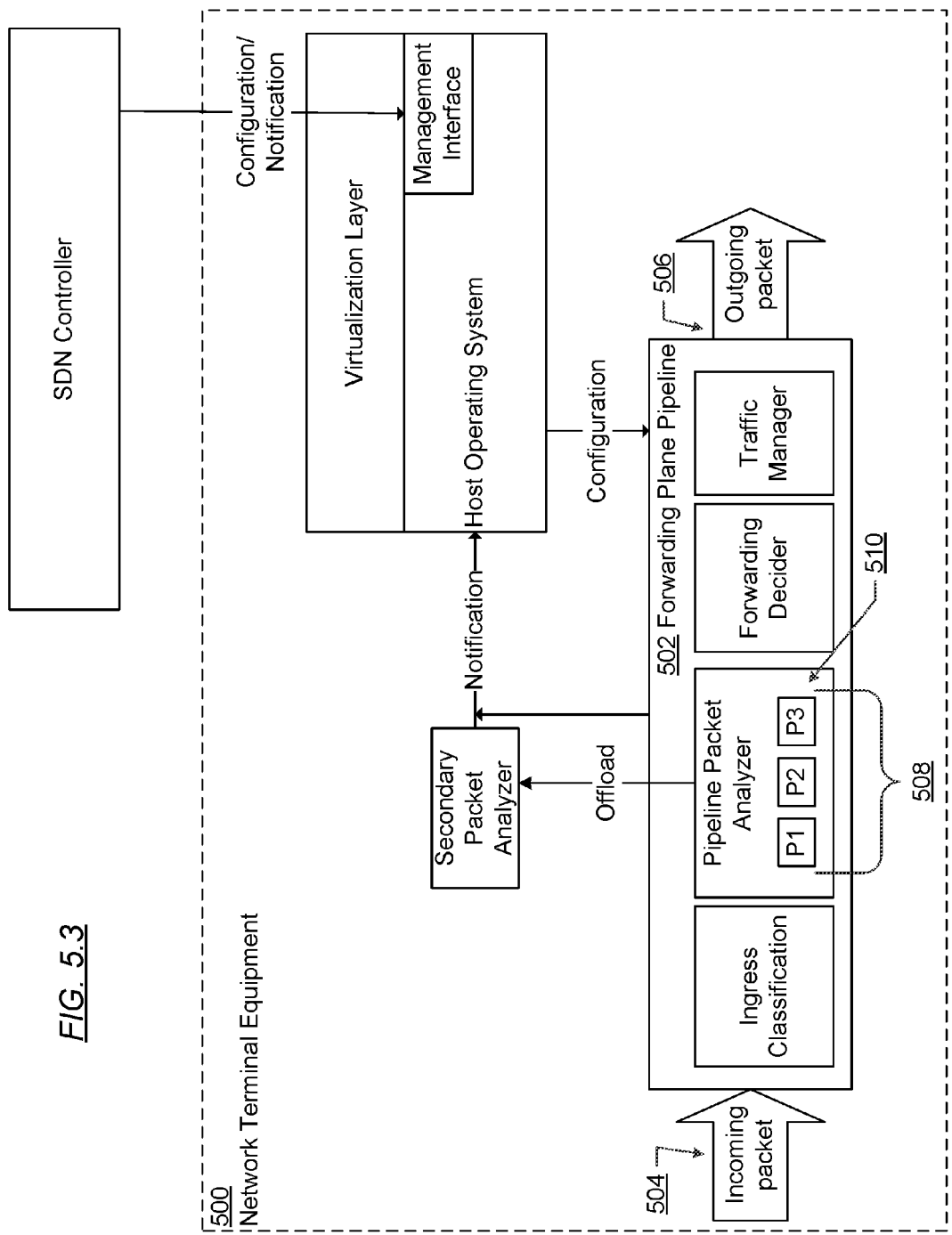
FIG. 5.3

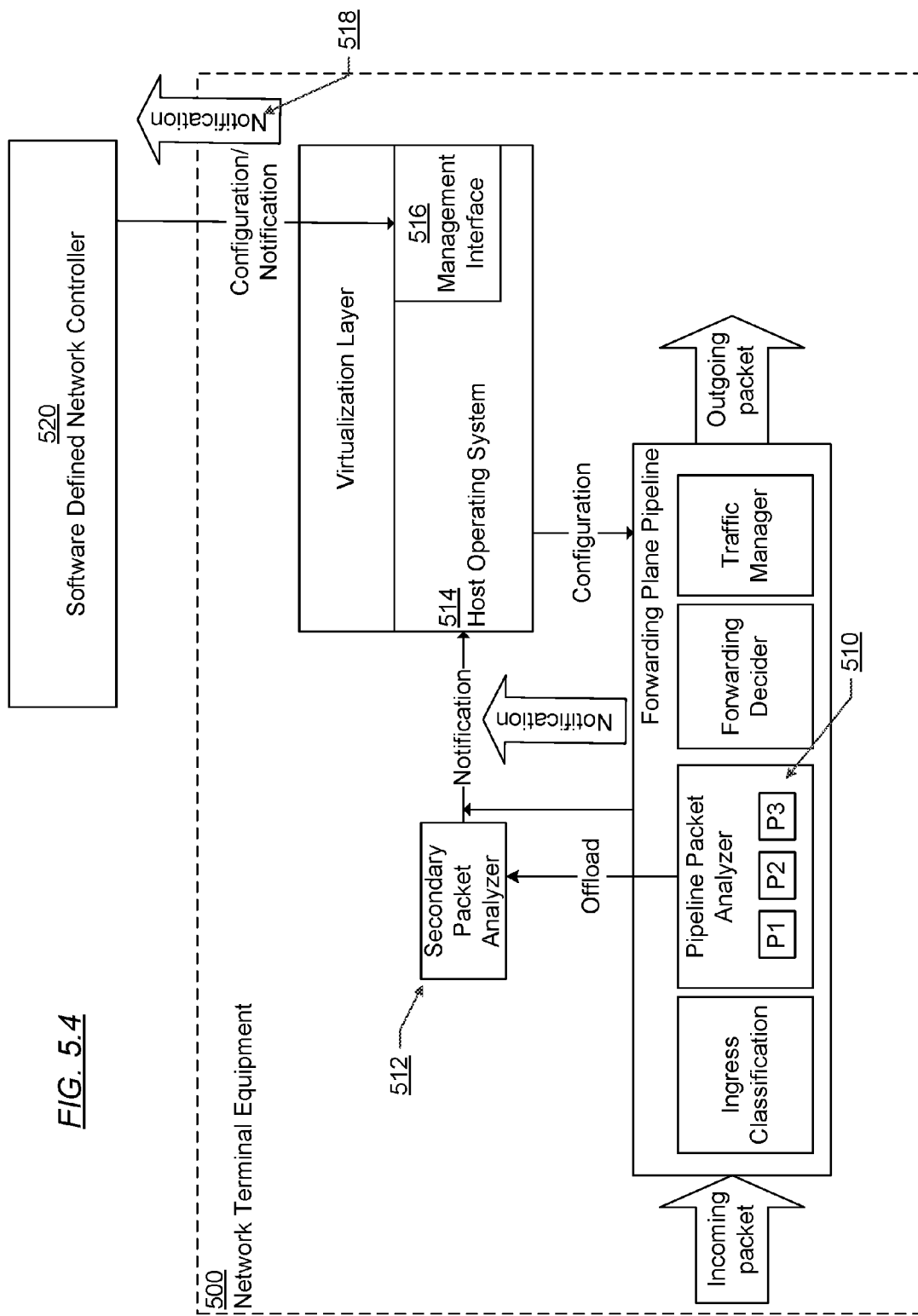
FIG. 5.4

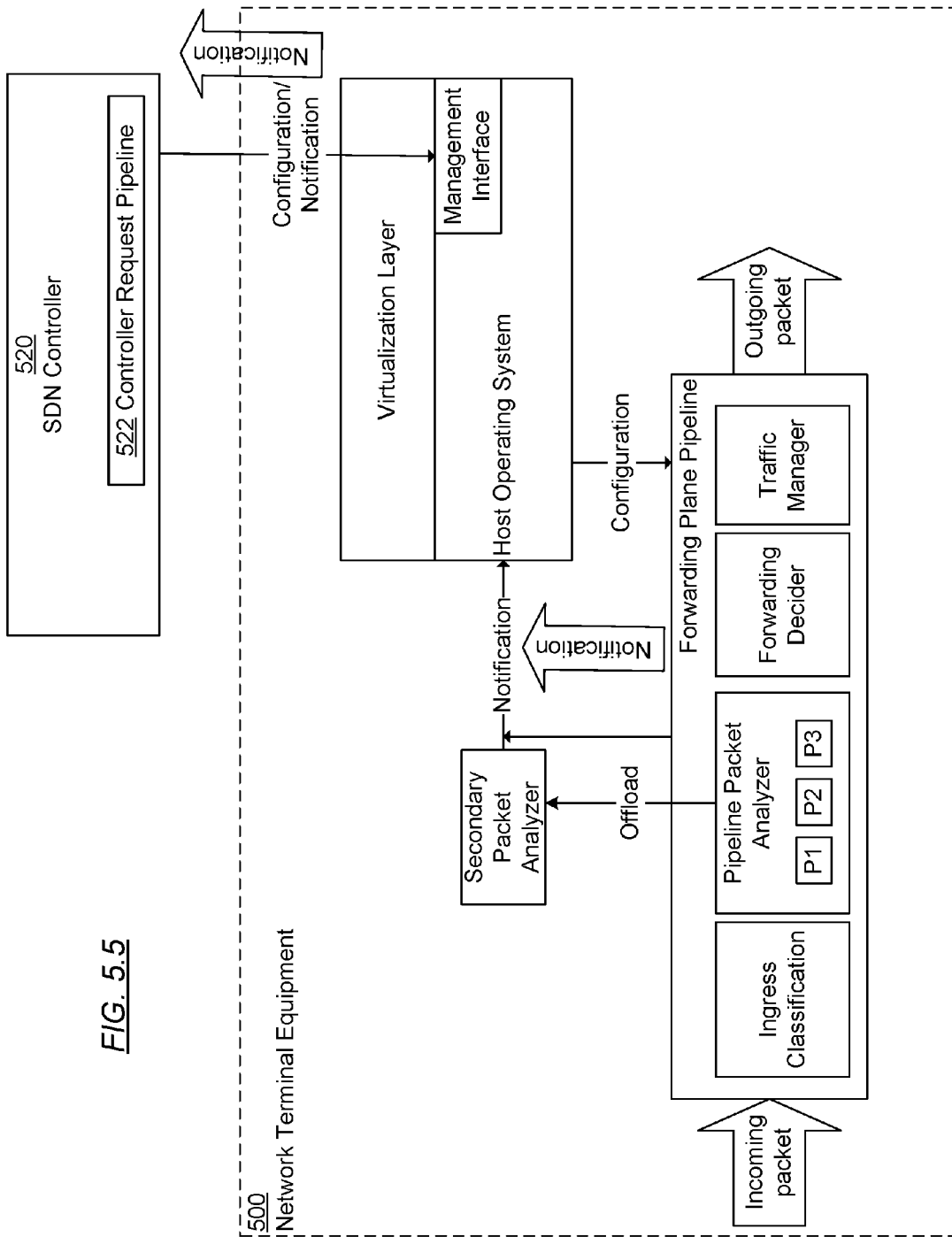
FIG. 5.5

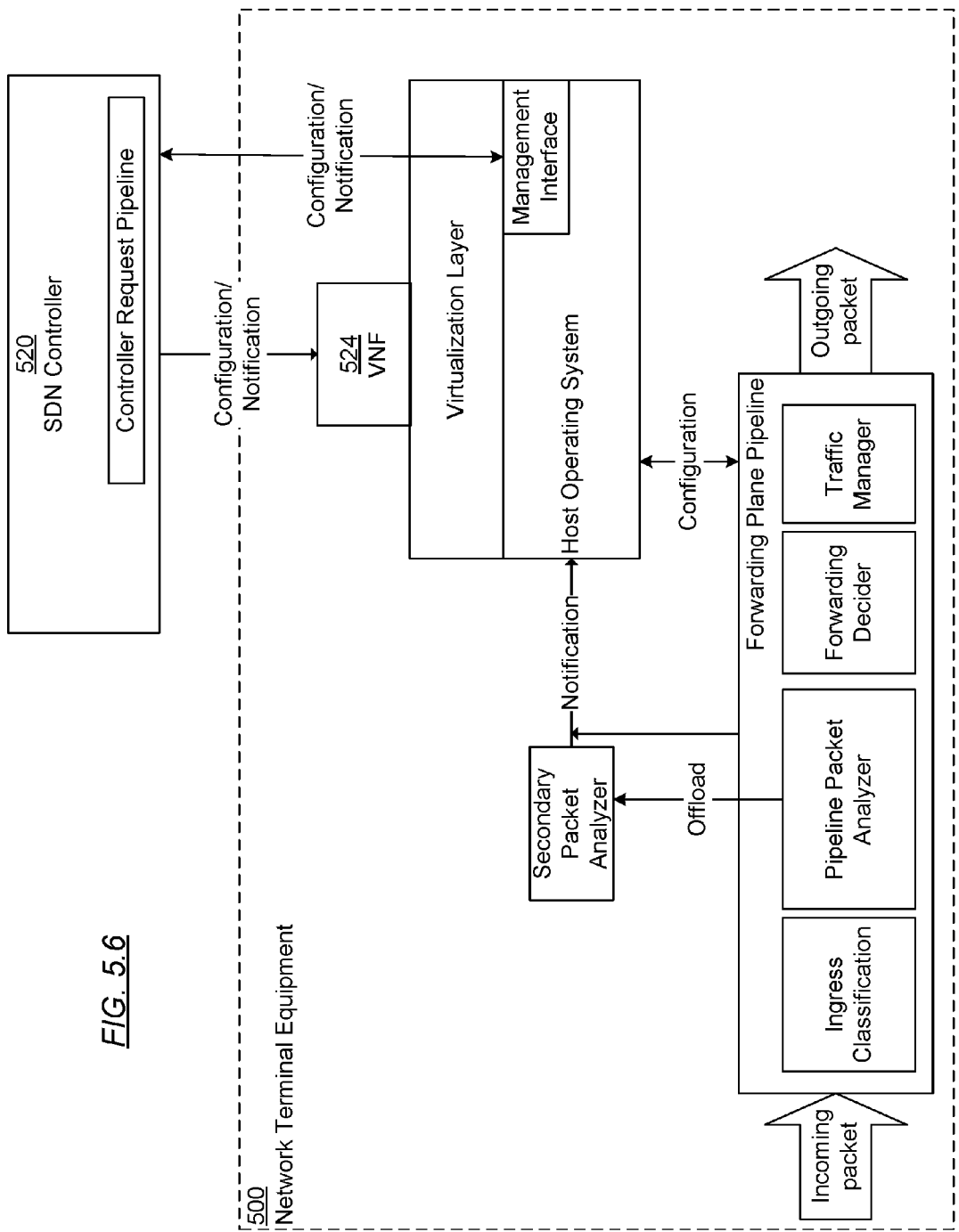
FIG. 5.6

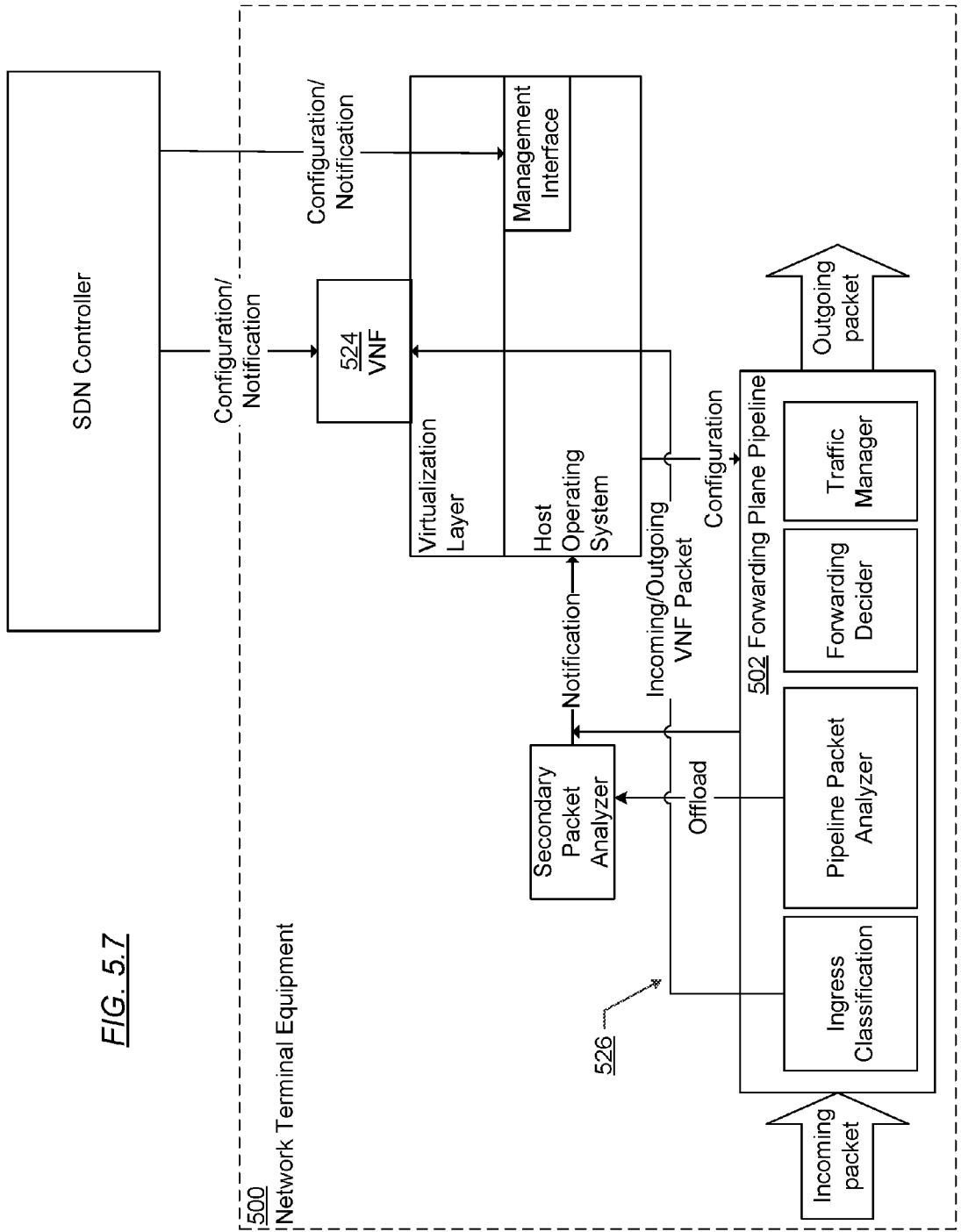
FIG. 5.7

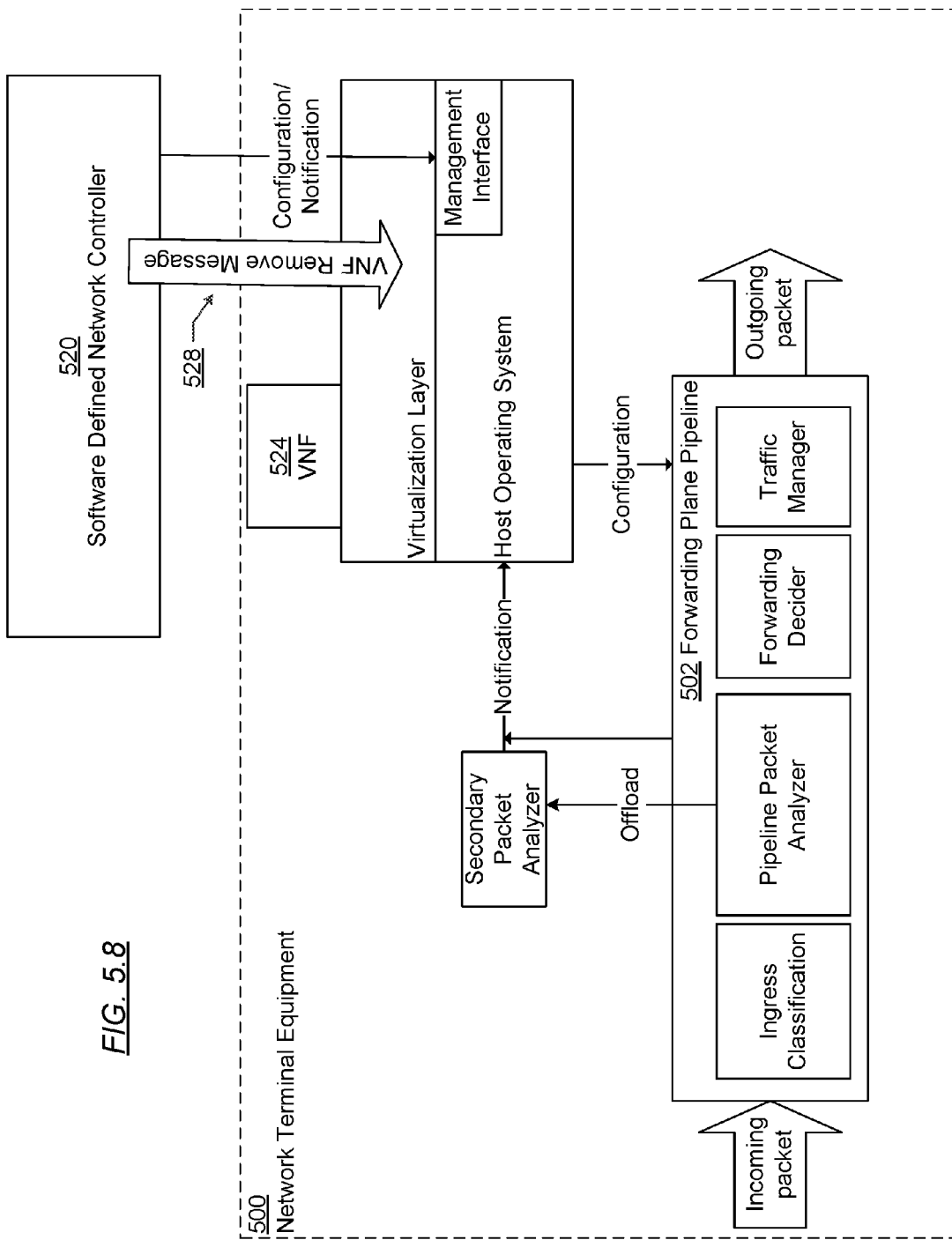
FIG. 5.8

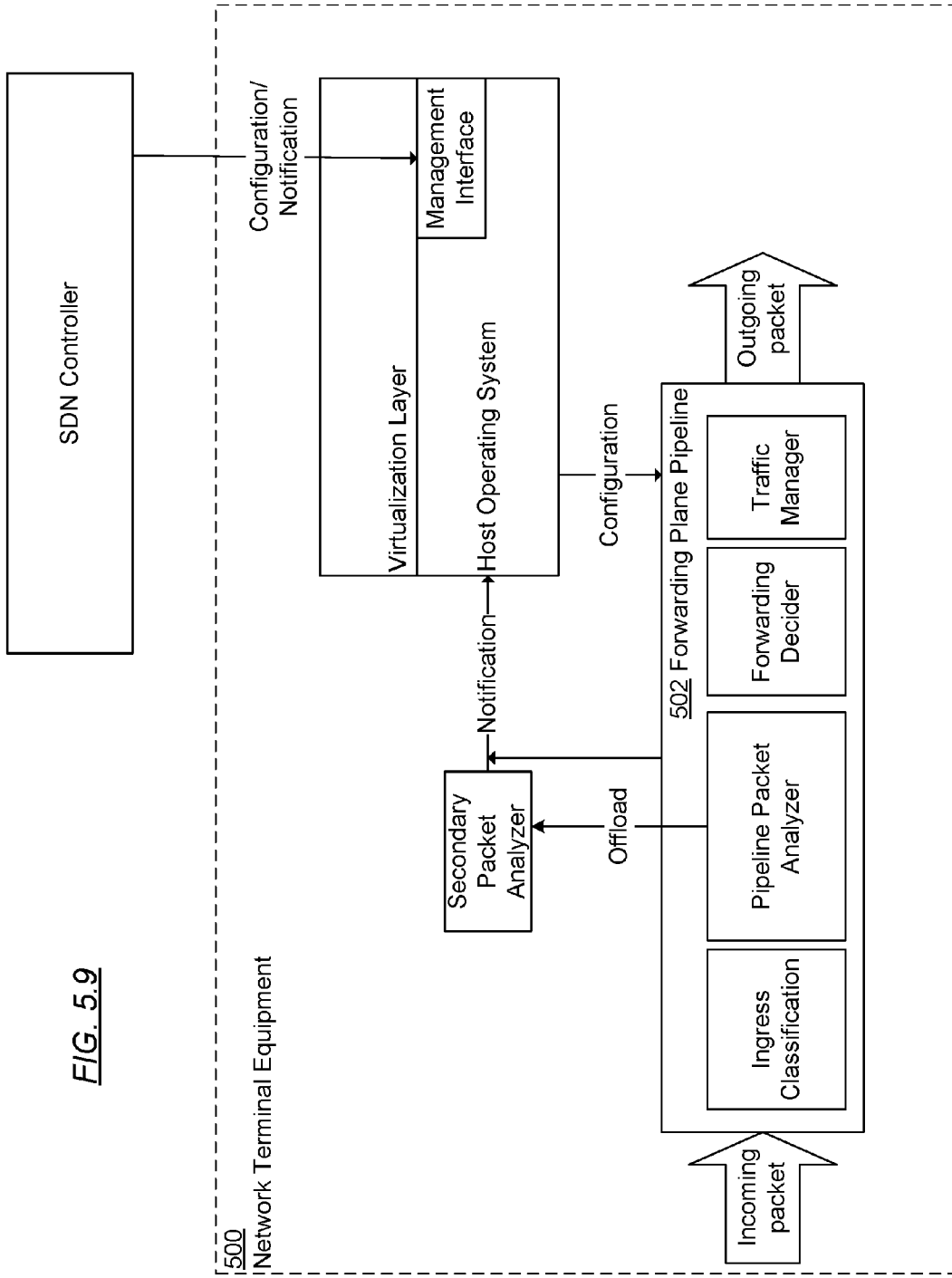
FIG. 5.9

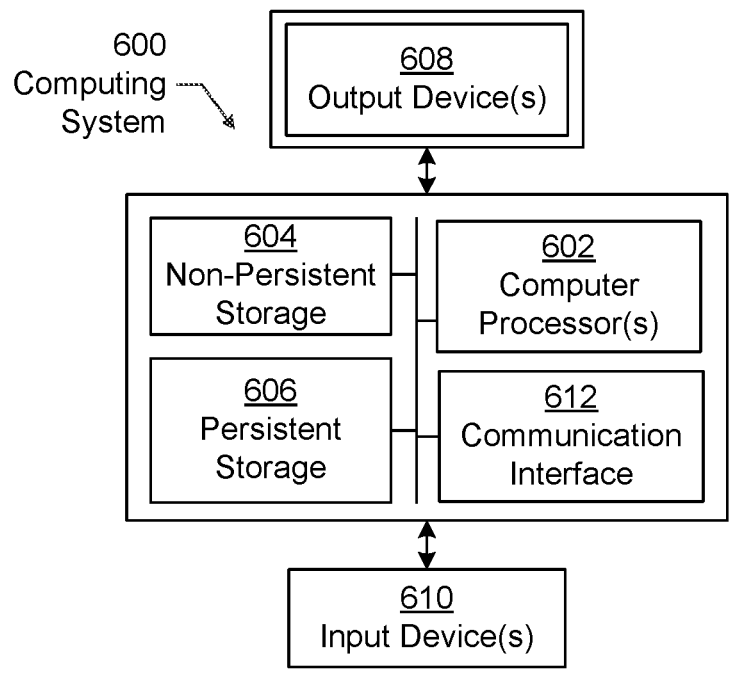
*FIG. 6.1*
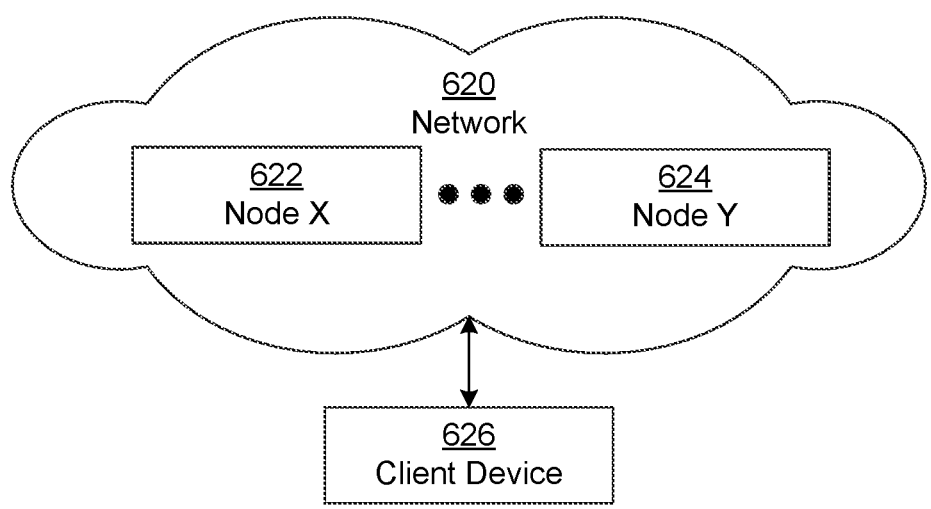
*FIG. 6.2*

FLOW BASED VIRTUAL NETWORK FUNCTION ORCHESTRATION

BACKGROUND

A network is a set of interconnected computing devices that provides for communication between the computing devices. In general, a network is supported by routers, switches, firewalls, intrusion detection, and other network functions. In other words, the various network functions manage the flow of packets through the network from one computing device to another computing device. Network functions may be virtualized by replacing a physical device that is dedicated to performing the network function with a virtual device. More particularly, a virtual network function is a network function that executes in a virtualized environment on a computing device, such as within a virtual machine, rather than on dedicated hardware.

SUMMARY

In general, in one aspect, one or more embodiments are directed to a method for computing device management. The method includes receiving a first incoming packet by a first computing device, analyzing the first incoming packet to identify a virtual network function (VNF) needed to process the first incoming packet, transmitting, to a software defined network controller and in response to the first incoming packet, an orchestration request requesting to orchestrate the VNF on the first computing device, and orchestrating the VNF on the first computing device. The method further includes processing a second incoming packet using the VNF on the first computing device.

In general, in one aspect, one or more embodiments are directed to a system for computing device management. The system includes a first computing device that is configured to receive a first incoming packet, analyze the first incoming packet to identify a virtual network function (VNF) needed to process the first incoming packet, transmit, to a software defined network controller and in response to the first incoming packet, an orchestration request requesting to orchestrate the VNF on the computing device, and orchestrate the VNF on the computing device. The first computing device is further configured to process a second incoming packet using the VNF. The system further includes the software defined network controller that is configured to process the orchestration request to orchestrate the VNF on the first computing device.

In general, in one aspect, one or more embodiments are directed to a system that includes a VNF market device including virtual network functions. The system further includes a software defined network controller connected to the VNF market that receives a request for orchestration of the VNF on a first computing device in response to an incoming packet at the first computing device, and processes the orchestration request using the VNF market device to orchestrate the VNF on the first computing device.

Other aspects of the invention will be apparent from the following description and the appended claims.

BRIEF DESCRIPTION OF DRAWINGS

FIGS. 1.1 and 1.2 show logical diagrams in accordance with one or more embodiments of the invention.

FIGS. 5.1, 5.2, 5.3, 5.4, 5.5, 5.6, 5.7, 5.8, and 5.9 show an example in accordance with one or more embodiments of the invention.

FIGS. 6.1 and 6.2 show a computing system in accordance with one or more embodiments of the invention.

DETAILED DESCRIPTION

Figure 2:
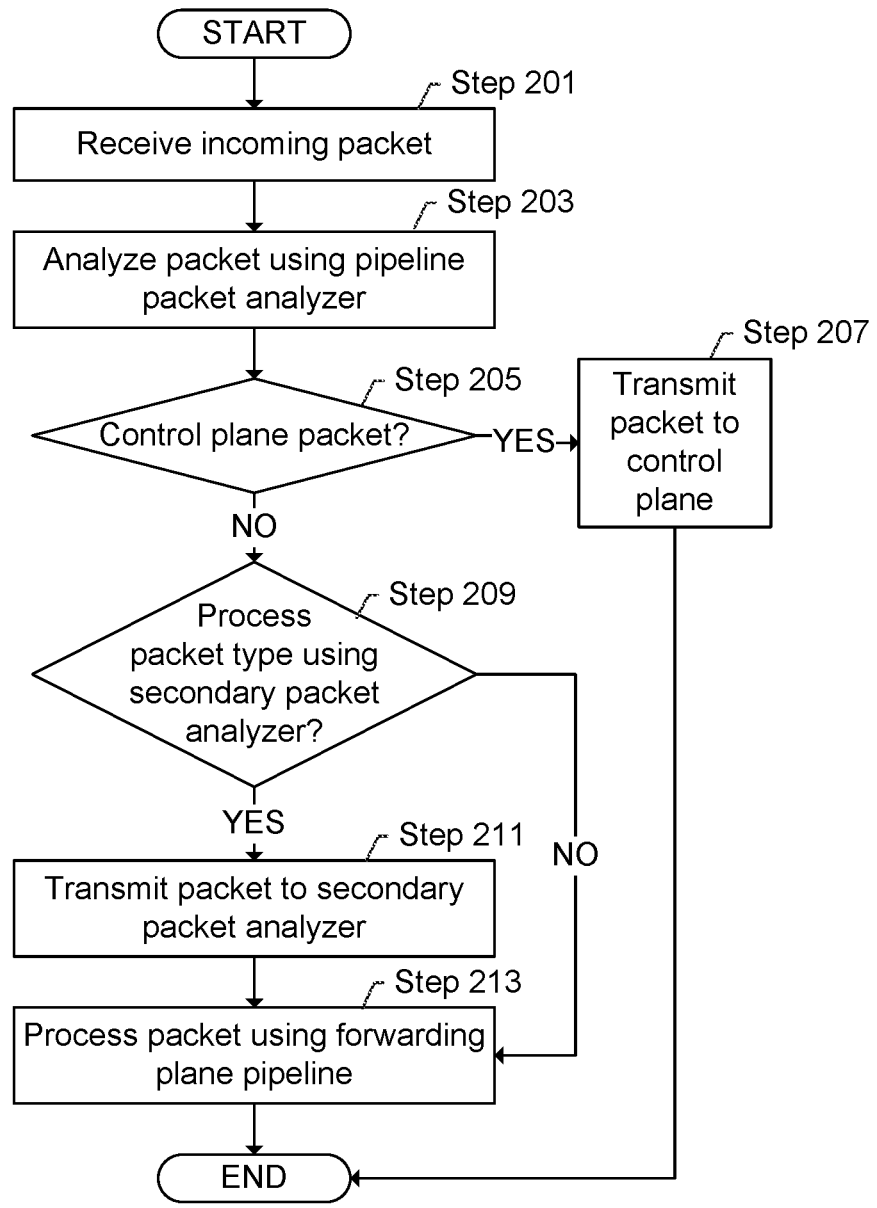
FIGS. 2, 3, and 4 show flowcharts in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the invention are directed to virtual network function (VNF) management. In particular, one or more embodiments orchestrate virtual network functions (VNFs) on a computing device on demand. When a packet is received by computing device that uses a VNF not installed on the computing device, a software defined network controller orchestrates the VNF on the computing device based on parameters and privileges for the orchestration. Thus, at least subsequent packets received by the computing device may be processed using the orchestrated VNF on the computing device.

A VNF is a network function that is virtualized to execute on a computing device, such as in a virtual machine on a computing device. In other words, the virtualization is a transformation of the hardware version of the network function to a software version. For example, a VNF may be a virtualized router, a virtualized switch, a virtualized firewall, a virtualized intrusion detection device, or other network function or combination of functions. In other words, the various network functions manage the flow of packets through the network from one computing device to another computing device. Network functions may be virtualized by replacing a physical device that is dedicated to performing the network function with a virtual device. More particularly, a virtual network function is a network function that executes in a virtualized environment on a computing device, such as within a virtual machine, rather than on dedicated hardware.

FIG. 1.1 shows a schematic diagram of a system in accordance with one or more embodiments of the invention. As shown in FIG. 1, the system includes computing devices (e.g., computing device X (102), computing device Y (104)), software defined network controller (106), an administrator device (108), a client device (110), and a VNF market (112). The various components of FIG. 1, such as computing devices (e.g., computing device X (102), computing device Y (104)), software defined network controller (106), an administrator device (108), client device (110), and a VNF market (112), may each correspond to a computing system shown in FIG. 6.1 and described below. Each of these components is described below.

A computing device (e.g., computing device X (102), computing device Y (104)) is any physical hardware and software that includes functionality to execute VNFs. In particular, the computing device may include hardware for supporting processing of packets and software for supporting virtualization of network functions. A computing device may be network terminal equipment. A logical diagram of a computing device is shown in FIG. 1.2.

Continuing with FIG. 1.1, a software defined network controller (106) is a controller that includes hardware, software, firmware, or any combination thereof that includes functionality to manage a software defined network. In other words, the software defined network controller (106) includes functionality to manage computing devices (e.g., computing device X (102), computing device Y (104)). In particular, the software defined network controller (106) includes functionality to orchestrate VNFs on the computing devices and remove VNFs from the computing device.

The administrator device (108) includes functionality to administrate the network. In other words, the administrator device (108) includes functionality to present an administrator application. The administrator application may be a local application that executes on the administrator device (108) or at least partially remote from the administrator computing device. For example, the administrator application may be a local application, a web application, or another application. Administrating the network may include configuring the software defined network controller (106), such as managing parameters for orchestrating VNFs, setting configuration parameters, and performing network management.

The client device (110) is a computing system that allows a client to manage VNFs for the client. In particular, one or more of the VNFs may be particular to a client. For example, the VNFs of a client may implement the virtual private network (VPN) for the client. By way of a more concrete example, the VNFs for a particular client may perform firewall, routing, intrusion detection, load management and other functions for a client's VPN. Different VNFs on the same computing device may be for different clients (not shown). In such a scenario, the VNFs are managed in isolated environments, such as virtual machines, on the computing devices. The client device may include functionality to present a client application for management of VNFs for the client. The client application may be a local and/or remote application to the client device. Further, the client application may include functionality to receive parameters for each VNF of the client. The parameters may include configuration parameters and orchestration parameters. Configuration parameters correspond to parameters defining the operations performed by a particular VNF. For example, the configuration parameters for a VNF that is a router may include information about routing protocols, definitions of routing maps, and other such parameters. The orchestration parameters include parameters that define how a VNF may be orchestrated on a computing device. For example, the orchestration parameters may include a maximum and/or minimum number of computing devices executing a particular VNF, one or more periods of time defined for one or more of the maximum and/or minimum number, number of packets to trigger orchestration of a VNF, removal parameters defining when to remove a VNF from a computing device (e.g., minimum throughput, amount of time since last packet for VNF received, amount of time), elapse time from failure of orchestration of a VNF before retrying orchestrating the VNF, and other parameters.

In one or more embodiments of the invention, a VNF market (112) is a combination of hardware and software that maintains VNFs, tracks deployment of VNFs, and manages an account for a client. The VNF market may include a data repository (not shown). In one or more embodiments of the invention, the data repository is any type of storage unit and/or device (e.g., a file system, database, collection of tables, or any other storage mechanism) for storing data. Further, the data repository may include multiple different storage units and/or devices. The multiple different storage units and/or devices may or may not be of the same type or located at the same physical site. The data repository includes functionality to store data, such as client administrative information (e.g., name of client, financial account information for billing the client, a list of billing preferences, virtual and/or physical addresses of the client), configuration information for each VNF of a client, computing device information (e.g., media access control address, network address, type information, hardware and software resource list, etc.) of each computing device (e.g., computing device X (102), computing device Y (104)), other information, or any combination of information.

Further, as shown in FIG. 1, the VNF market (112) includes an installation tracker (114), a client account manager (116), and VNFs (118). Each of the components of the VNF market (112) may correspond to hardware, software, or any combination thereof. The installation tracker (114) includes functionality to track installations of VNFs on the computing devices. Tracking installations may include tracking which computing devices are currently and historically executing each particular VNF, the amount of time each computing device is executing each particular VNF, and other tracking information. Different techniques may be used to track the execution of VNFs. For example, rather than or in addition to tracking, separately, the amount of time that each computing device executes each VNF, the tracking may be an aggregate amount of time that each particular VNF is executed. The installation tracker (114) may further include functionality to track when to remove a VNF from one or more computing devices.

The client account manager (116) includes functionality to manage the billing account for the client. In particular, the client account manager (116) may include functionality to generate and send an invoice to the client based on installations of VNFs of the client, and track payments by the client on the invoices.

The VNFs (118) in the VNF market are stored virtual network functions that are available for orchestration on the computing devices (e.g., computing device X (102), computing device Y (104)). For example, the VNF market may maintain copies of the VNFs to be distributed to the computing devices (e.g., computing device X (102), computing device Y (104)).

While FIG. 1.1 shows a configuration of components, other configurations may be used without departing from the scope of the invention. For example, various components may be combined to create a single component. As another example, the functionality performed by a single component may be performed by two or more components. By way of an example, the software defined network controller and the VNF market may be combined into a single device. By way of another example, multiple software defined network controllers may exist, whereby each software defined network controller manages a subset of the computing devices.

FIG. 1.2 shows a schematic diagram of a computing device (150) connected to a software defined network controller (152) in accordance with one or more embodiments of the invention. The software defined network controller (152) is the same or substantially the same as the software defined network controller described above with reference to FIG. 1.1. Further, the computing device (150) is at least one of the computing devices described above with reference to FIG. 1.1.

As shown in FIG. 1.2, the computing device (150) includes VNFs (e.g., VNF M (154), VNF N (156)), a virtualization layer (162), a host operating system (164), a forwarding plane pipeline (170), and a secondary packet analyzer (172). The VNFs (e.g., VNF M (154), VNF N (156)) are the same or substantially the same as the VNFs described above with reference to FIG. 1.1. VNFs may include functionality to send and receive messages from the software defined network controller (152). The messages may be notification messages and configuration messages (e.g., configuration/notification M (158), configuration/notification N (160)). The notification messages may notify the software defined network controller of the state of the VNF, and the configuration messages may be messages from the software defined network controller to configure the VNF.

In FIG. 1.1, the VNFs (e.g., VNF M (154), VNF N (156)) are orchestrated on the computing device (150) in accordance with one or more embodiments of the invention. The orchestration means that any received packets for the VNF may be processed by the VNF. The VNFs (e.g., VNF M (154), VNF N (156)) execute in a virtualization layer (162). The virtualization layer (162) is a layer that provides isolated execution environments for the VNFs. In other words, each VNF (e.g., VNF M (154), VNF N (156)) may execute in a distinct and separate virtual machine from other VNFs. The VNFs for the same client may execute in the same virtual machine in at least some embodiments of the invention. Each virtual machine is an isolated execution environment that has a separate operating system from other virtual machines. In other words, resources allocated to the virtual machine appear to applications and the operating system within the virtual machine as if the resources are the only resources available on the computing device. The virtualization layer (162) may be implemented as a hypervisor that includes functionality to allocate the resources to each virtual machine.

The virtualization layer (162) may execute within the context of a host operating system (164). The host operating system (164) includes functionality to manage the physical resources of the computing device (150) and provides a layer of abstraction of the physical resources to the virtualization layer (162). The host operating system (164) includes a management interface (166). The management interface (166) provides a local interface to request and perform orchestration of a VNF within a virtual machine on the computing device (150) with the software defined network controller (152). The management interface (166) may further include functionality to remove VNFs from the computing device (150). In other words, the management interface may include functionality to send and receive notification and configuration messages (168) with the software defined network controller. The notification messages may include an orchestration request that requests orchestration of a VNF on the computing device. The notification messages may further include tracking information, such as the number of packets sent to a VNF for processing, throughput information describing throughput of the VNF, and information describing which VNFs are orchestrated on the computing device. The configuration messages may include messages for performing orchestration (e.g., creating a virtual machine, configuring the virtual machine, installing a VNF in the virtual machine, activating an existing VNF, other such orchestration message, or combination thereof).

Continuing with FIG. 1.1, the forwarding plane pipeline (170) corresponds to hardware and/or software that include functionality to process packets. In other words, the forwarding plane pipeline may be implemented in hardware as a hardware pipeline, or at least partially virtualized in software as a software pipeline. If implemented in software, the forwarding plane pipeline may be executed as part of the host operating system (164), in a virtual machine on the computing device, or in another portion of the computing device. The forwarding plane pipeline (170) includes functionality to receive incoming packets (174) to the computing device (150), process the incoming packets (174) to obtain outgoing packets (176), and transmit the outgoing packets (176) to another computing device. Each outgoing packet may be the same as the corresponding incoming packet or may be a transformed version of the corresponding incoming packet (e.g., by transforming the header and/or body of the incoming packet).

The forwarding plane pipeline (170) includes an ingress classifier (178), a pipeline packet analyzer (180), a forwarding decider (182), and a traffic manager (184). The ingress classifier (178) includes functionality to perform initial classification of a packet. The initial classification may be to classify the packet to a particular domain based on the header in the packet. The domains may be associated with a virtual machine and/or VNF. Thus, if a VNF is orchestrated on the computing device, then the ingress classifier may transmit the packet via the host operating system (164) and virtualization layer (162) to the VNF for further processing.

If not classified as being for a particular domain, the packet may be transmitted to the pipeline packet analyzer (180). The pipeline packet analyzer (180) includes functionality to analyze the packet and determine whether an exception exists on the packet. For example, if the packet is for the control plane, then the pipeline packet analyzer (180) includes functionality to transmit the packet to the control plane manager (not shown). If an exception does not exist, the packet is transmitted to the forwarding decider (182) that identifies the next computing device to receive the packet. For example, the forwarding decider (182) may identify and append to the packet or to metadata for the packet, an identifier of the egress port on the computing device, where the egress port corresponds to the next computing device to which the packet is transmitted. The traffic manager (184) includes functionality to manage traffic onto the network for outgoing packets. For example, the traffic manager (184) may determine when and which packets are transmitted on the network. The management may be based on configuration of the algorithm to manage the flow and a configuration defining resources allocated to each domain. The host operating system (164) includes functionality to configure the forwarding plane pipeline. The configuration (186) may be performed by transmitting messages to the forwarding plane pipeline (170) or storing values of various configuration variables in a storage space defined for the forwarding plane pipeline (170).

Returning to the pipeline packet analyzer (180), if an exception exists, the pipeline packet analyzer (180) may offload (188) the packet to the secondary packet analyzer (172). The secondary packet analyzer (172) is hardware and/or software that include functionality to process packets. The secondary packet analyzer (172) is any packet analyzer that is external with respect to the forwarding plane pipeline. Thus, the secondary packet analyzer (172) does not slow the processing of packets by the forwarding plane pipeline (170). More particularly, the secondary packet analyzer (172) may be used to process more complex packets for performing more complex processing in order not to slow the forwarding plane pipeline in accordance with one or more embodiments of the invention. The secondary packet analyzer (172) may be located on the computing device (150) (as shown in FIG. 1.2) or may be external with respect to the computing device (150). The secondary packet analyzer (172) also includes functionality to determine whether an exception exists for a packet and process the exception when the exception exists. The secondary packet analyzer (172) includes functionality to send a notification (190) to the host operating system (164) based on the type of packet.

While FIG. 1.2 shows a configuration of components, other configurations may be used without departing from the scope of the invention. For example, various components may be combined to create a single component. As another example, the functionality performed by a single component may be performed by two or more components. By way an example, the secondary packet analyzer may be a part of the host operating system.

Figure 3:
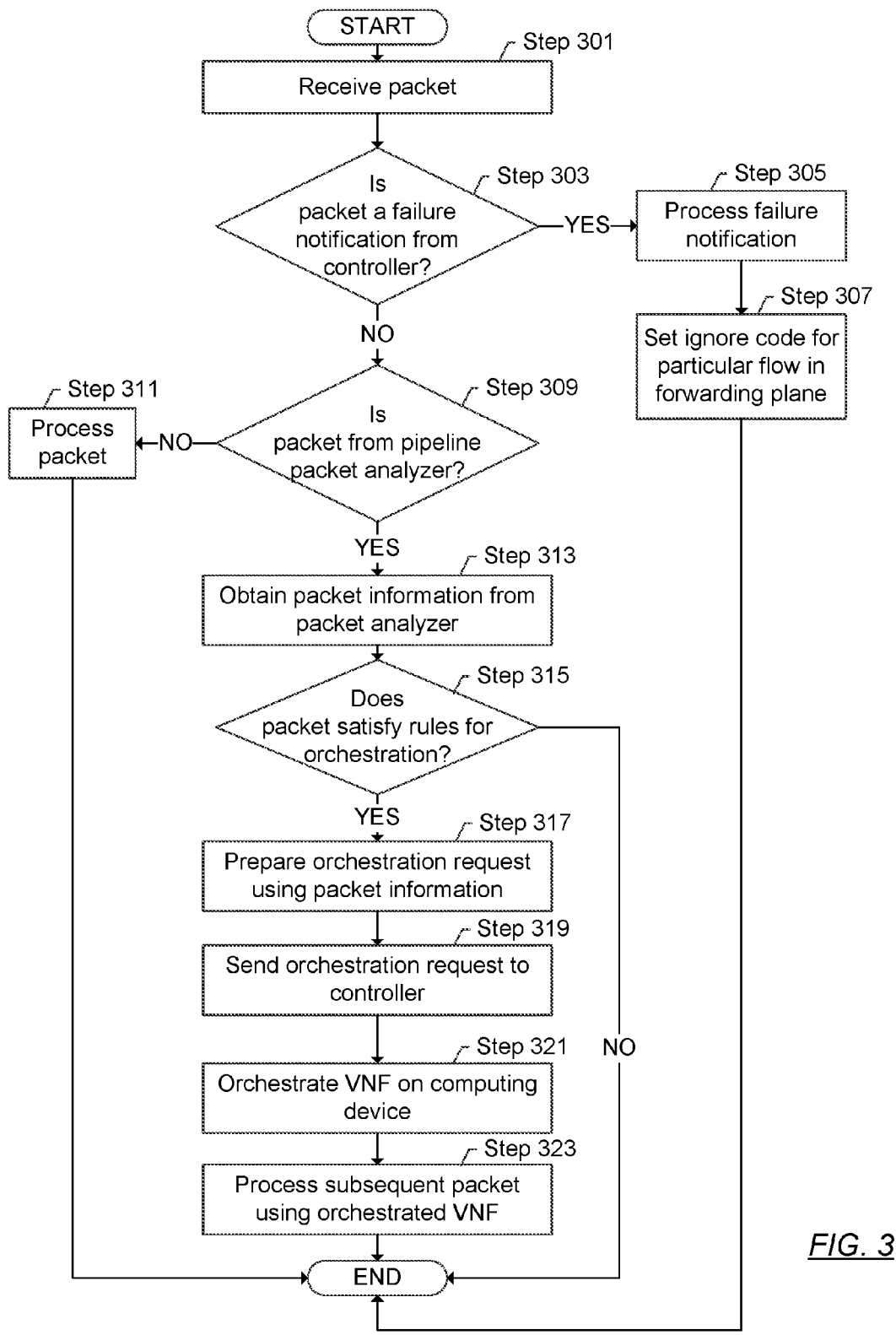
Figure 4:
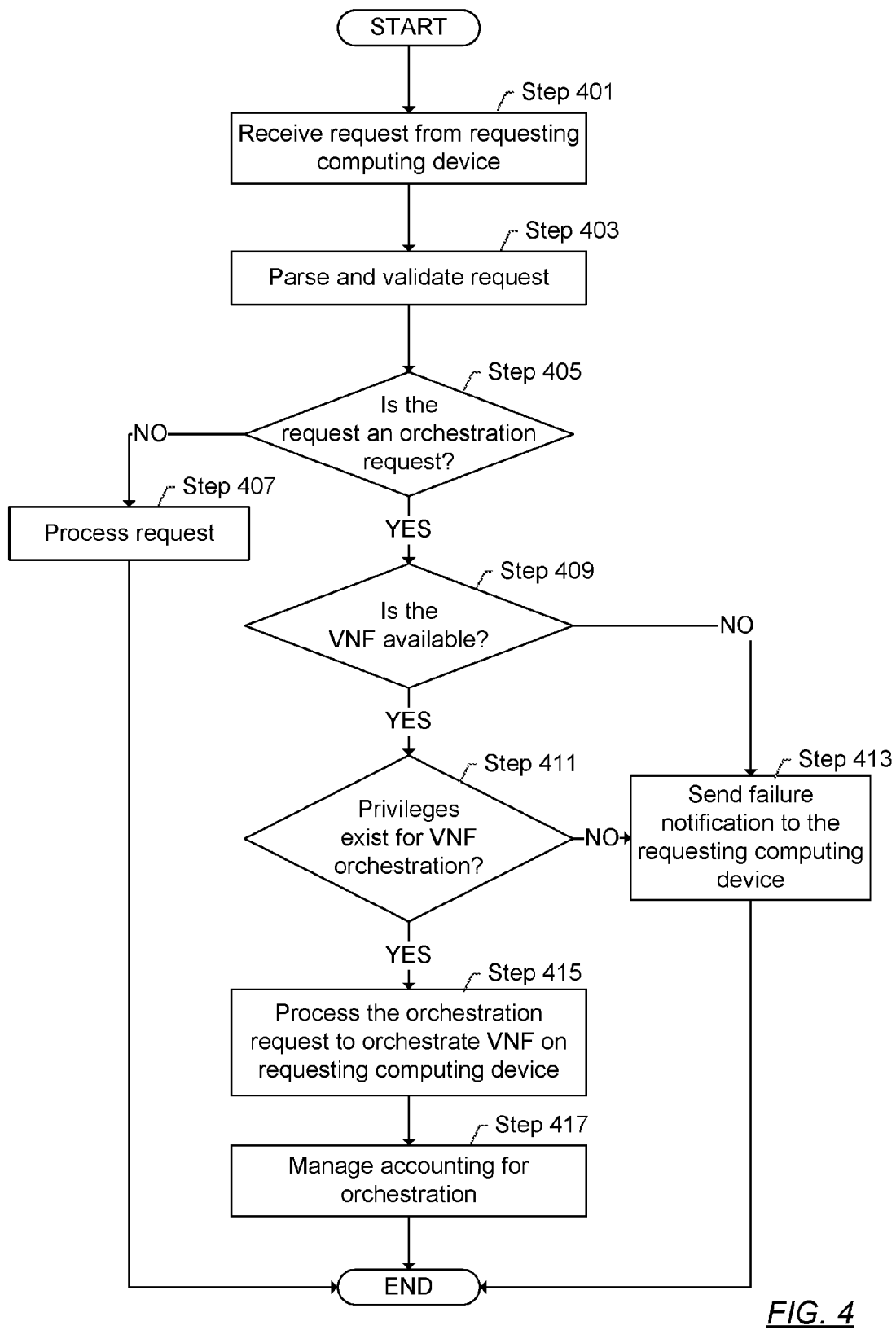

FIGS. 2-4 show flowcharts in accordance with one or more embodiments of the invention. While the various steps in these flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

Turning to FIG. 2, FIG. 2 shows a flowchart for processing a packet by a forwarding plane pipeline and, optionally, the secondary packet analyzer in accordance with one or more embodiments of the invention. In Step 201, an incoming packet is received in accordance with one or more embodiments of the invention. In particular, the incoming packet is received on an ingress port of the computing device. Based on the ingress port and the header of the packet, the ingress classifier may forward the packet to a particular VNF via the host operating system and virtualization layer. In such a scenario, the packet is processed by the selected VNF. If the packet is not to be forwarded, the ingress port may associate a domain with the packet and transmit the packet to the pipeline packet analyzer.

In Step 203, the pipeline packet analyzer analyzes the packet in accordance with one or more embodiments of the invention. The analysis may include using information in the header of the packet and/or metadata associated with the packet to identify entries in one or more tables in the forwarding plane pipeline, where the entries define how to process the packet. As part of the analysis, in Step 205, the pipeline packet analyzer determines whether the packet is a control plane packet in accordance with one or more embodiments of the invention. A control plane packet is a packet that is directed to the management of the overall network. For example, the control plane packet may be a packet that defines configuration of one or more networking tables. Determining whether a packet is a control plane packet may be based on an identifier in the packet. If the packet is a control plane packet, then the packet is transmitted to the control plane in Step 207. In other words, the pipeline packet analyzer sends the packet to a control plane manager on the computing device. The control plane manager may then process the packet and configure the local networking resources accordingly.

Returning to Step 205, if the packet is not a control plane packet, then a determination is made whether to process the packet using the secondary packet analyzer based on the packet type in accordance with one or more embodiments of the invention in Step 209. The secondary packet analyzer may be used for complex or deep packet analyzing methods which may be slow in the forwarding plane. Such packets are offloaded to the secondary packet analyzer, which is powerful enough to do such complex operations faster. Other reasons may exist to offload the packets to the secondary packet analyzer without departing from the scope of the invention. If a determination is made to process the packet using the secondary packet analyzer, then the packet is transmitted to the secondary packet analyzer in Step 211. The secondary packet analyzer may perform similar operations as described in Step 203. Regardless of whether the determination is made to process the packet by the secondary packet analyzer, the packet is process using the forwarding plane pipeline in Step 213. In other words, the packet may be forwarded to the forwarding decider and then to the traffic manager for sending to another computing device on the appropriate egress port.

Although not shown in FIG. 2, packets may be dropped or otherwise ignored if the packet is for a VNF that is not orchestrated on the device. By way of an example, after sending the packet to the secondary packet analyzer, the packet may be dropped by the forwarding plane pipeline such that the packet is not forwarded to another computing device. By way of another example, consider the scenario in which a packet is for a VNF that is not orchestrated on the computing device and a privilege does not exist for orchestrating the packet on the computing device. The forwarding plane pipeline may be configured to ignore the packet and any additional packets for the VNF without further processing of the packet including by the secondary packet analyzer. The configuration may be defined with a period of time by which the packets should be ignored. Thus, during the period of time, any packets for the VNF are ignored and are not offloaded to the secondary packet analyzer in accordance with one or more embodiments of the invention.

FIG. 3 shows a flowchart for processing a packet in accordance with one or more embodiments of the invention. The steps of FIG. 3 may be performed by the management interface and the host operating system. In other words, the pipeline packet analyzer or the secondary packet analyzer may analyze the packet and determine that an exception exists. The exception triggers the packet analyzer to send the packet to the host operating system to process the packet. In Step 301, a packet is received. In accordance with one or more embodiments of the invention, the packet is received from the pipeline packet analyzer, such as via inter-process communication techniques (e.g., message passing, shared memory, etc.).

In Step 303, a determination is made whether a packet is a failure notification from the software defined network controller in accordance with one or more embodiments of the invention. In other words, the packet may be a response to a prior sent orchestration request for orchestrating a VNF. Determining whether the packet is a failure notification may be performed by processing the payload of the packet and determining whether the payload of the packet indicates failure for orchestrating a VNF.

If the packet is a failure notification, then the failure notification is processed in Step 305 in accordance with one or more embodiments of the invention. Processing the failure notification locally marks the particular flow of packets as having failure. The failure notification may include an identifier of a length of time in which the failure is active. In other words, during the length of time, packets for the particular flow (i.e., that would be directed to the VNF which had a failed orchestration) are ignored and not processed. Processing the failure notification may include initiating a timer to track the length of time.

Further, in Step 307, an ignore code is set for the particular flow of packets in the forwarding plane pipeline in accordance with one or more embodiments of the invention. For example, the host operating system may set a configuration parameter defined for the particular flow in the packet processing pipeline and in the secondary packet analyzer with an ignore code (e.g., an alphanumeric or binary code to ignore packets for the particular VNF).

Returning to Step 303, if the packet is not a failure notification from the software defined network controller, then a determination is made whether the packet is from a pipeline packet analyzer in Step 309. In Step 311, normal processing of the packet is performed in accordance with one or more embodiments of the invention. In other words, the message in the packet or a set of packets is parsed and the corresponding action is performed.

Returning to Step 313, if the packet is from the secondary packet analyzer or pipeline packet analyzer, then the packet information is obtained from the secondary packet analyzer or pipeline packet analyzer. For example, the packet information may be extracted from the packet from the secondary packet analyzer or pipeline packet analyzer. The packet information may be in the header of the packet or may be with metadata associated with the packet. The information that is extracted is dependent on the type of packet. For example, networking layer 3, networking layer 4, and application headers may be extracted on top of parsing networking layer 2 header. The extraction may be used to determine the kind of VNF needed to handle the packets. For example, extracting the application headers in the packet may be used to identify the number of packets flowing to wide area network (WAN). In the example, based on the number of packets, the system may determine whether a VNF that has a WAN optimizer is needed to optimize the traffic. In one or more embodiments of the invention, a packet analyzer analyzes the packet information in the packet and determines that an exception exists. Based on the exception, the secondary packet analyzer may transmit the packet information to the management interface in the operating system.

In Step 315, a determination is made whether the packet satisfies rules for orchestration in accordance with one or more embodiments of the invention. For example, an initial validation procedure may be performed on the packet to authenticate the packet. If the packet does not satisfy the rules for orchestration, the flow may proceed to end without an orchestration request. If the packet satisfies the rules for orchestration, then the packet information is used to prepare an orchestration request in Step 317. The orchestration request may include, for example, VNF name, VNF type, computing node information such as CPU details, hypervisor details, VNF configuration, other information, or any combination of information. The orchestration request may be prepared by the management interface in the operating system.

In Step 319, the orchestration request is sent to the controller in accordance with one or more embodiments of the invention. In other words, the orchestration request is partitioned into one or more packets and transmitted via standard communication networking protocol to the controller.

In Step 321, the VNF is orchestrated on the computing device in accordance with one or more embodiments of the invention. At this stage, the software defined network controller may process the packet information to orchestrate the VPN on the computing device with the computing device. In other words, the software defined network controller and the computing device may orchestrate the VNF on the computing device as described below.

In Step 323, at least a subsequent packet is processed using the orchestrated VNF. In other words, a subsequent packet received may be processed by the orchestrated VNF. The subsequent packet may be a packet received any time after the packet that triggered the orchestration or a packet received after the orchestration is complete. Multiple subsequent packets may be processed by the orchestrated VNF.

FIG. 4 shows a flowchart for processing a packet by a software defined network controller in accordance with one or more embodiments of the invention. In Step 401, the software defined network controller receives a request from a requesting computing device in accordance with one or more embodiments of the invention. In other words, the software defined network controller receives a request via the network from the computing device that is requesting orchestration. For example, the request may be directly or indirectly received using communication protocols.

In Step 403, the request is parsed and validated in accordance with one or more embodiments of the invention. Parsing the request may include extracting the header and body of the request, and identifying the component parts from the request based on information in the request. Validating the request confirms that the request is from a computing device associated with the controller and is not from a nefarious entity. Validating the request may be performed by comparing information in the request with pre-stored information.

In Step 405, a determination is made whether the request is an orchestration request. In other words, the body of the request is accessed to determine whether the request is requesting a VPN on the computing device. If the request is not an orchestration request, the request is processed as normal in Step 407. More particularly, the software defined network controller may perform other management operations on the computing device.

If the request is determined to be an orchestration request in Step 405, the flow may proceed to Step 409. In Step 409, a determination is made whether the VNF is available in accordance with one or more embodiments of the invention. From the orchestration request, the VNF is identified. The VNF name and VNF type may be part of the orchestration request, and may be used to search the VNF market place to find the VNF image and details. The identified VNF is compared against available VNFs. The VNFs that are available may include VNFs which are inactive and on the computing device, VNFs which are on the controller, and/or VNFs in the VNF market. VNFs on the controller and in the VNF market may be a software package having software instructions for the VNF and/or a package having a virtual machine having the software instructions. Further, in Step 411, a determination is made whether privileges exist for the VNF orchestration. For example, the privileges may be whether the network administrator has administrative privileges for the computing device to orchestrate the VNF on the computing device. By way of another example, determining whether privileges exist may include determining whether the limit on the number of computing devices concurrently executing the VNF is reached. In other words, the software defined network controller may compare the number of concurrent executions of the VNF with a limit in the parameters for the VNF. If an additional VNF exceeds the limit, then the privilege may be determined not to exist.

Continuing with Steps 409 and 411, if the VNF is not available or if a privilege does not exist, then a failure notification is sent to the requesting computing device in Step 413 in accordance with one or more embodiments of the invention. In other words, the software defined network controller may create and send a response to the requesting computing device with a failure indicator set using standard communication protocols. The failure notification may include a period of time identifier identifying the time period by which any packets in the flow of packets for the VNF should be ignored. The period of time identifier may be obtained from parameters defined for the VNF.

Although not shown in FIG. 4, if an additional VNF does exceed the limit, then execution of the VNF may be migrated from another computing device to the requesting computing device based on tracking information. For example, tracking information may be used to identify a computing device which should stop executing the VNF.

In Step 415, if privileges exist for VNF orchestration, the orchestration request is processed to orchestrate the VNF on the requesting computing device in accordance with one or more embodiments of the invention. Processing the orchestration request includes the steps for performing the orchestration on the computing device. Both the computing device and the software defined network controller may perform the orchestration in accordance with one or more embodiments of the invention. For example, the software defined network controller may send instructions for the orchestration to the computing device via the management interface, which processes the instructions to perform the orchestration. If the code for the VNF is already on the computing device, then instructions are sent to the VNF to activate the VNF on the computing device. If the VNF is not on the computing device, then the package for the VNF is obtained from local storage or from the VNF market and transmitted to the requesting computing device. Further, instructions for orchestration are transmitted to the host operating system. The host operating system and the virtualization layer may manage installation and activation of the VNF. Further, configuration information for configuring the packet processing pipeline is sent to the packet processing pipeline in accordance with one or more embodiments of the invention. Other techniques for orchestration may be used without departing from the scope of the invention. Once the VNF is orchestrated on the requesting computing device, at least subsequent packets received by the requesting computing device may be processed by the VNF. Thus, one or more embodiments provide on demand orchestration of the VNF.

In Step 417, accounting for the orchestration is managed in accordance with one or more embodiments of the invention. In one or more embodiments of the invention, the software defined network controller may transmit a notification to the installation tracker of the new orchestration of the VNF. The client account manager may use the information to generate an invoice for the client based on the number of orchestrations of the VNF. Because VNFs are orchestrated on demand, the client may be invoiced based on a more accurate projection of usage of VNFs. Namely, if the requesting computing device just received a packet for the VNF, then the requesting computing device is likely to receive another packet for the VNF within a certain time limit.

Although not shown in FIGS. 2-4, one or more embodiments may be used to remove VNFs from the computing devices. In particular, the computing device may periodically send usage information to the software defined network controller. Based on the usage information, the software defined network controller may send commands to the computing device defining when to inactivate or remove the VNF. Alternatively, the software defined network controller may send, during orchestration, a command specifying when to remove or inactivate the VNF based on the usage of the VNF. In such an alternative, the computing device may remove or inactivate the VNF without waiting for a subsequent command from the software defined network controller.

FIGS. 5.1-5.9 show an example in accordance with one or more embodiments of the invention. FIGS. 5.1-5.9 show a time sequence of the states of the network terminal equipment and the software defined network (SDN) controller. The example is for explanatory purposes only and not intended to limit the scope of the invention. In the example, the computing device is network terminal equipment. Further, components in FIGS. 5.1-5.9 are examples of like named components in FIG. 1.2. Turning to FIG. 5.1, the network terminal equipment (500) is in a state in which VNFs are not installed and packets are not being currently received. In other words, as shown by the lack of packets flowing to the forwarding plane pipeline (502), no packets are being received.

In FIG. 5.2, the network terminal equipment (500) is in a state in which incoming packets (504) are being received. The network terminal equipment processes the packets using the forwarding plane pipeline (502) and generates outgoing packets (506). In FIG. 5.3, packets p1, p2, and p3 (508) are being processed by the pipeline packet analyzer (510) in the forwarding plane pipeline (502).

In FIG. 5.4, the pipeline packet analyzer (510) offloads the packet to the secondary packet analyzer (512). The secondary packet analyzer (512) determines that an exception exists and sends a notification to the host operating system (514). The management interface (516) in the host operating system (514) sends a notification with an orchestration request (518) to the software defined network controller (520) based on information from the secondary packet analyzer.

In FIG. 5.5, the software defined network controller (520) processes the packet through the controller request pipeline (522). In the controller request pipeline (522), the controller parses the request, validates the request, authorizes the request, and prepares the orchestration. In FIG. 5.6, the software defined network controller (520) orchestrates the VNF by downloading and installing the VNF (524) on the network terminal equipment.

Thus, in FIG. 5.7, the newly orchestrated VNF (524) may process packets (526) in the packet flows from the forwarding plane pipeline (502). When the usage of the VNF (524) is no longer needed or falls outside of the parameters, the VNF may be removed. In FIG. 5.8, the software defined network controller (520) sends a removal message (528) to the network terminal equipment (500) to remove the VNF (524). As shown in FIG. 5.9, the VNF is removed from the network terminal equipment (500). As discussed above, the removal may be uninstalling the software for the VNF, marking the virtual machine having the VNF as available for deletion, and/or deactivating the VNF. As shown in the example, one or more embodiments allow for on-demand orchestration of VNFs on network terminal equipment.

Embodiments of the invention, such as various components of FIG. 1, may be implemented on a computing system. Any combination of mobile, desktop, server, router, switch, embedded device, or other types of hardware may be used. For example, as shown in FIG. 6.1, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

The computing system (600) in FIG. 6.1 may be connected to or be a part of a network. For example, as shown in FIG. 6.2, the network (620) may include multiple nodes (e.g., node X (622), node Y (624)). Each node may correspond to a computing system, such as the computing system shown in FIG. 6.1, or a group of nodes combined may correspond to the computing system shown in FIG. 6.1. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (600) may be located at a remote location and connected to the other elements over a network.

Although not shown in FIG. 6.2, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6.1. Further, the client device (626) may include and/or perform all or a portion of one or more embodiments of the invention.

The computing system or group of computing systems described in FIGS. 6.1 and 6.2 may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the invention. The processes may be part of the same or different application and may execute on the same or different computing system.

Rather than or in addition to sharing data between processes, the computing system performing one or more embodiments of the invention may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments of the invention, may extract one or more data items from the obtained data. For example, the extraction may be performed as follows by the computing system in FIG. 6.1. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail—such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as XML).

The extracted data may be used for further processing by the computing system. For example, the computing system of FIG. 6.1, while performing one or more embodiments of the invention, may perform data comparison. Data comparison may be used to compare two or more data values (e.g., A, B). For example, one or more embodiments may determine whether A>B, A=B, A!=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments of the invention, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system in FIG. 6.1 may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system of FIG. 6.1 may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions present only a few examples of functions performed by the computing system of FIG. 6.1 and the nodes and/or client device in FIG. 6.2. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for computing device management, comprising:
   receiving a first incoming packet by a first computing device;
   analyzing the first incoming packet to identify a virtual network function (VNF) needed to process the first incoming packet;
   transmitting, to a software defined network (SDN) controller and in response to the first incoming packet, an orchestration request requesting to orchestrate the VNF on the first computing device;
   determining whether a privilege exists for orchestration of the VNF on the first computing device and a second computing device, wherein the SDN controller processes the orchestration request in response to the privilege existing for the first computing device;
   orchestrating, in response to the SDN controller processing the orchestration request, the VNF on the first computing device;
   processing a second incoming packet using the VNF on the first computing device;
   transmitting a failure notification to the second computing device in response to the privilege failing to exist for the second computing device, wherein the failure notification comprises a length of time of a failure; and
   preventing, during the length of time of the failure, a third incoming packet received by the second computing device from requesting to orchestrate the VNF on the second computing device.

2. The method of claim 1, wherein analyzing the first incoming packet comprises:
   analyzing the first incoming packet using a pipeline packet analyzer to obtain a result;
   transmitting the first incoming packet to a secondary packet analyzer based on the result;
   processing the first incoming packet by the secondary packet analyzer to determine that a flow exception exists for the first incoming packet;
   transmitting the flow exception to a management interface of an operating system on the computing device, wherein the management interface transmits the orchestration request.

3. The method of claim 2, wherein transmitting the flow exception comprises transmitting packet information describing the first incoming packet.

4. The method of claim 1, further comprising:
   marking a flow comprising the failure notification as having the failure; and
   initiating a timer to track the length of time of the failure.

5. The method of claim 1, further comprising:
   obtaining the VNF from a VNF market; and
   transmitting the VNF to the first computing device.

6. The method of claim 1, further comprising:
   receiving, by the VNF market, a plurality of parameters for orchestrating the VNF on a distributed system comprising a plurality of computing device, wherein the plurality of computing device comprising the first computing device and the second computing device.

7. The method of claim 6, further comprising:
   generating an invoice based on orchestration of the VNF on the first computing device in accordance with the plurality of parameters.

8. The method of claim 6, wherein the plurality of parameters define whether a privilege exists for the first computing device.

9. The method of claim 6, wherein the plurality of parameters define a limit on a number of the plurality of computing device concurrently executing the VNF.

10. A system for computing device management comprising:
a first computing device that is configured to
receive a first incoming packet,
analyze the first incoming packet to identify a virtual network function (VNF) needed to process the first incoming packet,
transmit, to a software defined network (SDN) controller and in response to the first incoming packet, an orchestration request requesting to orchestrate the VNF on the computing device,
orchestrate, in response to the SDN controller processing the orchestration request, the VNF on the computing device, and
process a second incoming packet using the orchestrated VNF; and
the SDN controller that is configured to
determine whether a privilege exists for orchestration of the VNF on the first computing device and a second computing device;
process, in response to the privilege existing for the first computing device, the orchestration request to orchestrate the VNF on the first computing device;
transmit a failure notification to the second computing device in response to the privilege failing to exist for the second computing device, wherein the failure notification comprises a length of time of a failure; and
prevent, during the length of time of the failure, a third incoming packet received by the second computing device from requesting to orchestrate the VNF on the second computing device.

11. The system of claim 10, wherein the software defined network controller further:
marks a flow comprising the failure notification as having the failure; and
initiates a timer to track the length of time of the failure.

12. The system of claim 10, further comprising:
a VNF market device storing a plurality of VNFs, wherein the software defined network controller obtains the VNF from the VNF market.

13. The system of claim 12, wherein the VNF market device comprises:
an installation tracker that tracks a plurality of installations of the plurality of VNFs on the plurality of computing devices; and
an account manager that manages billing based on the plurality of installations of the plurality of VNFs.

14. A system comprising:
a VNF market device comprising a plurality of virtual network functions comprising a virtual network function (VNF); and
a software defined network (SDN) controller connected to the VNF market device that is configured to:
receive a request for orchestration of the VNF on a first computing device in response to an incoming packet at the first computing device,
determine whether a privilege exists for orchestration of the VNF on the first computing device and a second computing device,
process, in response to the privilege existing for the first computing device, the orchestration request using the VNF market device to orchestrate the VNF on the first computing device,
transmit a failure notification to the second computing device in response to the privilege failing to exist for the second computing device, wherein the failure notification comprises a length of time of a failure, and
prevent, during the length of time of the failure, a third incoming packet received by the second computing device from requesting to orchestrate the VNF on the second computing device.

15. The system of claim 14, wherein the software defined network controller further:
marks a flow comprising the failure notification as having the failure, and
initiates a timer to track the length of time of the failure.

16. The system of claim 14, wherein the VNF market comprises:
an installation tracker that tracks a plurality of installations of the plurality of VNFs on the plurality of computing device.

17. The system of claim 16, wherein the VNF market comprises:
an account manager that manages billing based on the plurality of installations of the plurality of VNFs.

18. The system of claim 14, wherein the VNF market further:
receives a plurality of parameters for orchestrating the VNF on a distributed system comprising a plurality of computing device, wherein the plurality of computing devices comprising the first computing device and the second computing device.

19. The system of claim 18, wherein the VNF market further:
sends an invoice to the client based on orchestration of the VNF on the first computing device in accordance with the plurality of parameters.

20. The system of claim 18, wherein the VNF market sends the plurality of parameters to the software defined network controller to process the request.

* * * * *